United States Patent
Qi

(10) Patent No.: US 12,342,252 B2
(45) Date of Patent: Jun. 24, 2025

(54) METHOD AND SYSTEM FOR WIRELESS DATA TRANSMISSION

(71) Applicant: GM Global Technology Operations LLC, Detroit, MI (US)

(72) Inventor: Wenyuan Qi, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 89 days.

(21) Appl. No.: 18/522,448

(22) Filed: Nov. 29, 2023

(65) Prior Publication Data

US 2025/0168607 A1 May 22, 2025

(30) Foreign Application Priority Data

Nov. 16, 2023 (CN) .......................... 202311534292.2

(51) Int. Cl.
*H04W 4/44* (2018.01)
*H04W 4/38* (2018.01)

(52) U.S. Cl.
CPC .............. *H04W 4/44* (2018.02); *H04W 4/38* (2018.02)

(58) Field of Classification Search
CPC .................................. H04W 4/44; H04W 4/38
See application file for complete search history.

(56) References Cited

U.S. PATENT DOCUMENTS

| | | | |
|---|---|---|---|
| 11,748,945 B1 * | 9/2023 | Monaghan | G06T 9/007 345/419 |
| 2021/0099711 A1 * | 4/2021 | Tourapis | H04N 19/147 |
| 2022/0305950 A1 | 9/2022 | Zhu et al. | |
| 2023/0171431 A1 * | 6/2023 | Oh | H04N 19/30 375/240.12 |
| 2023/0245317 A1 * | 8/2023 | Morard | G16H 50/70 382/128 |

FOREIGN PATENT DOCUMENTS

DE 102022203832 A1 10/2023
WO 2022117183 A1 6/2022

* cited by examiner

*Primary Examiner* — Henry Tsai
*Assistant Examiner* — John B Roche
(74) *Attorney, Agent, or Firm* — Vivacqua Crane, PLLC

(57) ABSTRACT

A method for wireless data transmission and reconstruction includes receiving data from a vehicle, extracting key frames from the data, and encoding, using an encoder of a variable autoencoder, the key frames of the data into a latent space to generate compressed data. The method also includes transmitting the compressed data from the vehicle to a remote server. The method includes generating, using a decoder of the variable autoencoder, data points from the compressed data, where the data points are representative of the data received from the vehicle.

20 Claims, 2 Drawing Sheets

METHOD AND SYSTEM FOR WIRELESS DATA TRANSMISSION

INTRODUCTION

The present disclosure relates to a system and method for wireless data transmission.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

The robustness of wireless communication applications depends on the quality and bandwidth of the network environment. Unstable and high interference network environments may cause data loss and transmission errors. Wireless data transmissions that require high bandwidth may cause relatively large latency and data inconsistency issues. It is therefore desirable to develop a method and system for wireless data transmission that can handle high bandwidth transmissions while preventing, or at least minimizing, latency and data inconsistency issues.

SUMMARY

The present disclosure describes a method for wireless data transmission and reconstruction. The method includes receiving data from a vehicle, extracting key frames from the data, and encoding, using an encoder of a variable autoencoder, the key frames of the data into a latent space to generate compressed data. The method also includes transmitting the compressed data from the vehicle to a remote server. The method includes generating, using a decoder of the variable autoencoder, data points from the compressed data, where the data points are representative of the data received from the vehicle. The method described in this paragraph improves wireless data transmission technology by minimizing the bandwidth required to transmit data from a vehicle to a remote server, thereby minimizing latency issues.

In some aspects of the present disclosure, the data from the vehicle includes sensor data collected by a sensor of the vehicle. The key frames serve as an input of the encoder of the variable autoencoder. The method may further include extracting the key frames from the sensor data collected by the sensor of the vehicle. The remote server may sample the compressed data in equal time intervals. The discriminator discriminates between the data points generated by the decoder of the variable autoencoder and the sensor data. The method may include compensating for a latency of the data points generated by the decoder of the variable autoencoder. To do so, the method includes evenly interpolate and extrapolate the samples in the latent space, which could help minimize the effects of unstable latency. The encoder may be configured as a first neural network that maps the sensor data into the latent space. The sensor data is in an input space. The decoder may be configured as a second neural network that maps the compressed data into the input space.

The present disclosure further describes a system for wireless data transmission. The system includes a remote server in communication with a vehicle. The remote server includes a processor and a tangible, non-transitory, machine-readable medium. The remote server the processor to is programmed to execute the method described above.

The present disclosure also describes a tangible, non-transitory, machine-readable medium, comprising machine-readable instructions, that when executed by a processor, cause the processor to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
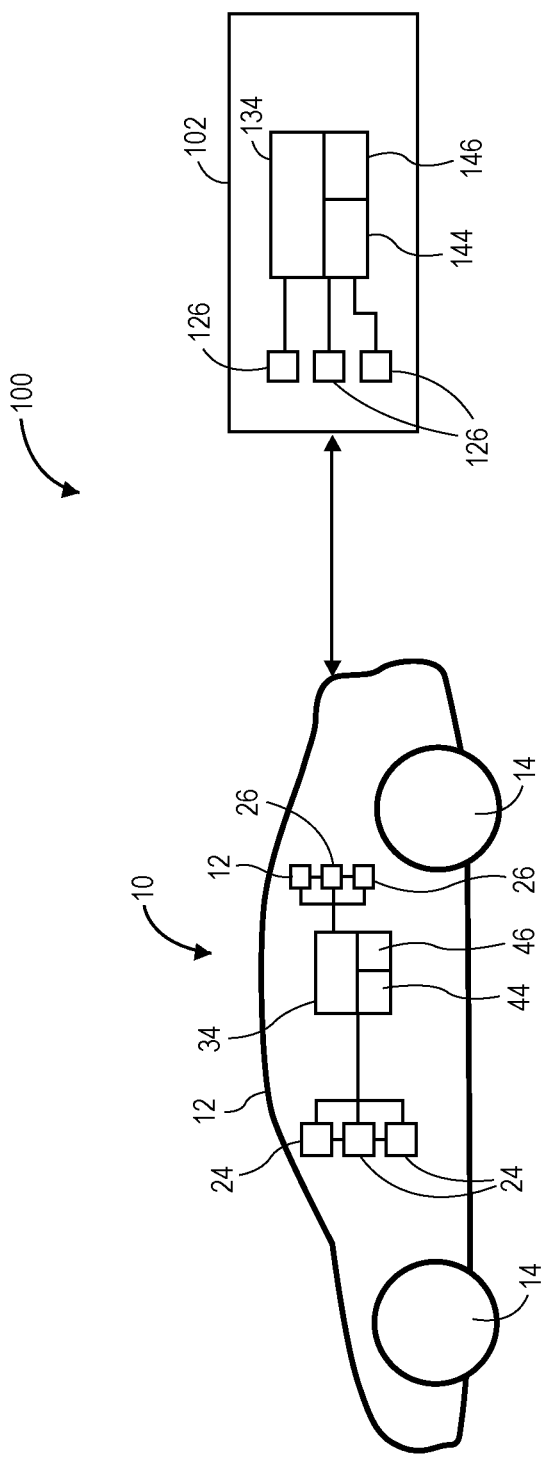
FIG. 1 is a schematic diagram of a system for wireless data transmission.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a system 100 for wireless data transmission includes one or more vehicles 10 and one or more remote server 102 in wireless communication with the vehicles 10. As non-limiting examples, the remote server 102 may be a cloud server or an edge server. Each of the vehicles 10 generally includes a body 12 and a plurality of wheels 14 coupled to the body 12. The vehicle 10 may be an autonomous vehicle. In the depicted embodiment, the vehicle 10 is depicted in the illustrated embodiment as a sedan, but it should be appreciated that other vehicles including trucks, coupes, sport utility vehicles (SUVs), recreational vehicles (RVs), etc., may also be used.

The vehicle 10 further includes one or more sensors 24 coupled to the body 12. The sensors 24 sense observable conditions of the exterior environment and/or the interior environment of the vehicle 10. As non-limiting examples, the sensors 24 may include one or more cameras, one or more light detection and ranging (LIDAR) sensors, one or more proximity sensors, one or more cameras, one or more ultrasonic sensors, one or more thermal imaging sensors, and/or other sensors. Each sensor 24 is configured to generate a signal that is indicative of the sensed observable conditions (i.e., sensor data) of the exterior environment and/or the interior environment of the vehicle 10. The signal is indicative of the sensor data collected by the sensors 24.

The vehicle 10 includes a vehicle controller 34 in communication with the sensors 24. The vehicle controller 34 includes at least one vehicle processor 44 and a vehicle non-transitory computer readable storage device or media 46. The vehicle processor 44 may be a custom made or commercially available processor, a central processing unit (CPU), a graphics processing unit (GPU), an auxiliary processor among several processors associated with the vehicle controller 34, a semiconductor-based microprocessor (in the form of a microchip or chip set), a macroprocessor, a combination thereof, or generally a device for executing instructions. The vehicle readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the vehicle processor 44 is powered down. The vehicle computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 34 in controlling the vehicle 10. The vehicle controller 34 may be programmed to execute at least part of the method 200 (FIG. 2) as described in detail below.

The instructions may include one or more separate programs, each of which comprises an ordered listing of executable instructions for implementing logical functions. The instructions, when executed by the vehicle processor 44, receive and process signals from sensors, perform logic, calculations, methods and/or algorithms for automatically controlling the components of the vehicle 10, and generate control signals to automatically control the components of the vehicle 10 based on the logic, calculations, methods, and/or algorithms. Although a single vehicle controller 34 is shown in FIG. 1, embodiments of the vehicle 10 may include a plurality of vehicle controllers 34 that communicate over a suitable communication medium or a combination of communication mediums and that cooperate to process the sensor signals, perform logic, calculations, methods, and/or algorithms, and generate control signals to automatically control features of the vehicle 10. The vehicle controller 34 is part of the system 100 for wireless data transmission.

The vehicle 10 further includes one or more vehicle transceivers 26 in communication with the vehicle controller 34 to allow the vehicle 10 to wirelessly communicate data to and from other entities, such as the remote server 102. As non-limiting examples, the vehicle transceivers 26 may transmit and/or receive data from other vehicles ("V2V" communication), infrastructure ("V2I" communication), remote systems at a remote call center (e.g., ON-STAR by GENERAL MOTORS) and/or personal electronic devices, such as a mobile phone. In certain embodiments, the vehicle transceivers 26 are part of a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

As discussed above, the vehicle 10 is in wireless communication with the remote server 102. To do so, the remote server 102 includes one or more server transceivers 126. As non-limiting examples, the server transceivers 126 may transmit and/or receive data from other vehicles ("V2V" communication), infrastructure ("V2I" communication), and/or personal electronic devices, such as a mobile phone. In certain embodiments, the server transceivers 126 are part of a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The remote server 102 further includes a server controller 134 in communication with the server transceivers 126. The server controller 134 includes at least one server processor 144 and a server non-transitory computer readable storage device or media 146. The server processor 144 may be a custom made or commercially available processor, a central processing unit (CPU), a graphics processing unit (GPU), an auxiliary processor among several processors associated with the server controller 134, a semiconductor-based microprocessor (in the form of a microchip or chip set), a macroprocessor, a combination thereof, or generally a device for executing instructions. The server readable storage device or media 146 may include volatile and nonvolatile storage in read-only memory (ROM), random-access memory (RAM), and keep-alive memory (KAM), for example. KAM is a persistent or non-volatile memory that may be used to store various operating variables while the server processor 144 is powered down. The server computer-readable storage device or media 146 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the server controller 134 in controlling the remote server 102. The server controller 134 may be programmed to execute at least part of the method 200 (FIG. 2) as described in detail below. Although a single server controller 134 is shown in FIG. 1, embodiments of the remote server 102 may include a plurality of server controllers 134 that communicate over a suitable communication medium or a combination of communication mediums and that cooperate to process the sensor signals, perform logic, calculations, methods, and/or algorithms, and generate control signals to automatically control features of the remote server 102. The server controller 134 is part of the system 100 for wireless data transmission.

Figure 2:
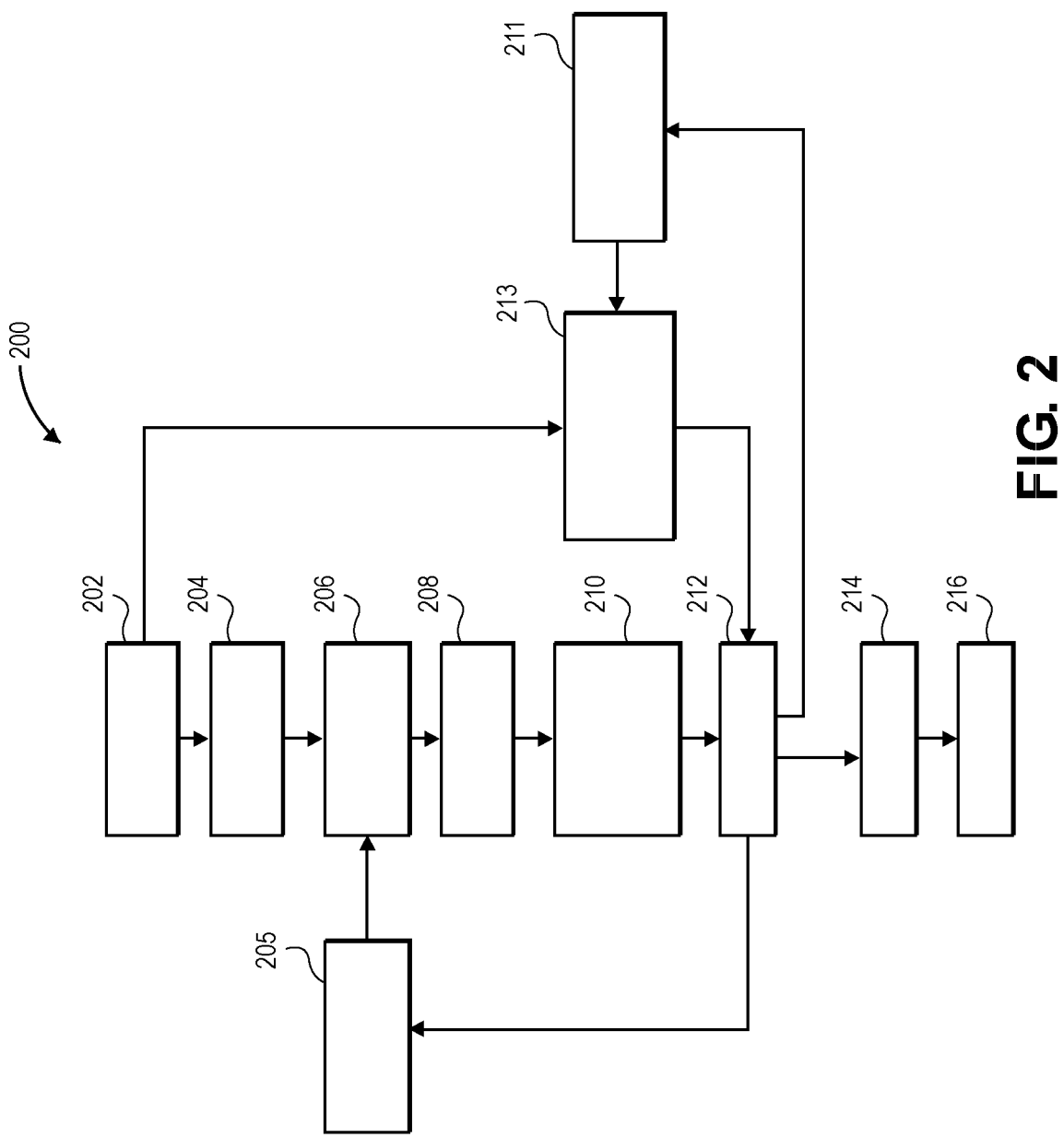
FIG. 2 is a method for wireless data transmission.

FIG. 2 is a flowchart of a method 200 for wireless data transmission. The method 200 begins at block 202. At block 202, the sensors 24 of the vehicles 10 collect sensor data. As discussed above, the sensors 24 sense observable conditions of the exterior environment and/or the interior environment of the vehicles 10. Accordingly, the sensor data collected by the sensors 24 is indicative of observable conditions of the exterior environment and/or the interior environment of the vehicle 10. The vehicle 10 may also collect other kind of data, such as location data by a Global Positioning System (GPS). The method 200 then proceeds to block 204.

At block 204, the vehicle controller 34 extracts key frames from the data collected from the vehicles 10, such as the sensor data collected by the sensors 24 of the vehicles 10, to minimize the data transmission load and thereby generate key frame data. The term "key frame" means a frame that that defines the starting and ending points of a smooth transition. Then, the method 200 continues to block 206.

At block 206, the vehicle controller 34 encode the key frames of the data collected from the vehicle 10 (e.g., sensor data) into a latent space using an encoder of a variable autoencoder. Therefore, the key frames serve as an input of the encoder. Encoding the key frames generates compressed data. The sensor data is in an input space. The latent space is a lower-dimensional space relative to the input space to minimize the burden of data transmission. The encoder of the variable autoencoder is a first neural network that maps the sensor data (or other data from the vehicle 10) into the latent space. This encoder of the variable autoencoder has been previously trained at block 205.

Block 205 represents an incremental encoder training process. The encoder of the variable autoencoder iteratively updates steps based on a batch of newly captured sensor data. The trained encoder represents the features of the sensor data (e.g., feature of vehicle, important events, driving behaviors and surrounding traffic situations).

After block 206, the method 200 continues to block 208. At block 208, the compressed data (as encoded by the encoder of the variable autoencoder) is transmitted from the vehicle 10 to the remotes server 102 via one or more networks. The vehicle transceivers 26 and the server transceivers 126 are used to wireless transmit the data from the vehicle 10 to the remote server 102. The method 200 then continues to block 210.

At block 210, the remote server 102 samples the compressed data in equal time intervals in the latent space according to the time stamp in order to compensate for the time latency. The time intervals may be less than the data receiving frequency to compensate for the time latency. The method 200 may use interpolation of the sampled compressed data to account for missing data. Further, the method 200 may use extrapolation to predict future data. The method 200 then continues to block 212.

At block 212, the remote controller 134 uses a pretrained decoder of the variable autoencoder to reconstruct the sensor data (or other data) from the vehicle 10 based on the compressed data (in the latent space) generated by the encoder. In other words, the decoder of the variable autoencoder generates data points that are representative of the sensor data (or other data) from the vehicle 10. The decoder is a second neural network that maps the compressed data into the input space. The decoder may be trained using the sensor data (or other data) from the vehicle 10 and a decoder optimizer at block 211. Then, at block 213, the decoder of the variable autoencoder is trained using the sensor data (or other data) from the vehicle 10. At block 211, the parameters of the decoder are updated to generate more precise frame data to test against a discriminator. At block 213, the discriminator discriminates between the data points generated by the decoder and the sensor data (or other data) from the vehicle 10. The method 200 then continues at block 214.

At block 214, the remote server 102 reconstructs the sensor data (or other data) from the vehicle 10 using the decoder as explained above. Next, the method 200 continues to block 216. At block 216, the remote server 102 uses a time compensation model to compensate for latency between different frame date due to unstable network conditions. Thus, the remote server 102 can regenerate the fully time-continuous sensor data with the help of the variable autoencoder. The regenerated sensor data may be useful in downstream applications, such as sensor fusion, object recognition and decision making.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for wireless data transmission and reconstruction, comprising:
   receiving data from a vehicle;
   extracting key frames from the data;
   encoding, using an encoder of a variable autoencoder, the key frames of the data into a latent space to generate compressed data;
   transmitting the compressed data from the vehicle to a remote server; and
   generating, using a decoder of the variable autoencoder, data points from the compressed data, wherein the data points are representative of the data received from the vehicle.

2. The method of claim 1, wherein the data from the vehicle includes sensor data collected by a sensor of the vehicle.

3. The method of claim 2, wherein the key frames serve as an input of the encoder of the variable autoencoder, and the method includes extracting the key frames from the sensor data collected by the sensor of the vehicle.

4. The method of claim 3, wherein the remote server samples the compressed data in equal time intervals.

5. The method of claim 4, further comprising updating a plurality of parameters of the decoder of the variable autoencoder using a discriminator.

6. The method of claim 5, further comprising compensating for a latency of the data points generated by the decoder of the variable autoencoder.

7. The method of claim 6, wherein the encoder is a first neural network that maps the sensor data into the latent space, the sensor data is in an input space, and the decoder is a second neural network that maps the compressed data into the input space.

8. A tangible, non-transitory, machine-readable medium, comprising machine-readable instructions, that when executed by a processor, cause the processor to:
receive sensor data collected by a sensor of a vehicle;
encode, using an encoder of a variable autoencoder, the sensor data into latent space to generate compressed data;
transmit the compressed data from the vehicle to a remote server; and
generate, using a decoder of the variable autoencoder, data points from the compressed data, wherein the data points are representative of the sensor data collected by the sensor of the vehicle.

9. The tangible, non-transitory, machine-readable medium of claim 8, wherein the tangible, non-transitory, machine-readable medium further comprising machine-readable instructions, that when executed by the processor, causes the processor to extract key frames from the sensor data to generate kay frame data.

10. The tangible, non-transitory, machine-readable medium of claim 9, wherein the key frames serve as an input of the encoder of the variable autoencoder.

11. The tangible, non-transitory, machine-readable medium of claim 10, wherein the remote server samples the compressed data in equal time intervals.

12. The tangible, non-transitory, machine-readable medium of claim 11, wherein the tangible, non-transitory, machine-readable medium further comprising machine-readable instructions, that when executed by the processor, causes the processor to update a plurality of parameters of the decoder of the variable autoencoder using a discriminator.

13. The tangible, non-transitory, machine-readable medium of claim 12, wherein the tangible, non-transitory, machine-readable medium further comprising machine-readable instructions, that when executed by the processor, causes the processor to compensate for a latency of the data points generated by the decoder of the variable autoencoder.

14. The tangible, non-transitory, machine-readable medium of claim 13, wherein the encoder is a first neural network that maps the sensor data into the latent space, the sensor data is in an input space, and the decoder is a second neural network that maps the compressed data into the input space.

15. A system for wireless data transmission and reconstruction, comprising:
a remote server in communication with a vehicle, wherein the remote server includes a processor and a tangible, non-transitory, machine-readable medium, and the remote server the processor to is programmed to:
receive sensor data collected by a sensor of the vehicle;
encode, using an encoder of a variable autoencoder, the sensor data into latent space to generate compressed data; and
generate, using a decoder of the variable autoencoder, data points from the compressed data, wherein the data points are representative of the sensor data collected by the sensor of the vehicle.

16. The system of claim 15, wherein the remote server is programmed to extract key frames from the sensor data to generate kay frame data.

17. The system of claim 16, wherein the key frames serve as an input of the encoder of the variable autoencoder.

18. The system of claim 17, wherein the remote server samples the compressed data in equal time intervals.

19. The system of claim 18, wherein the remote server is programmed to update a plurality of parameters of the decoder of the variable autoencoder using a discriminator.

20. The system of claim 19, wherein the remote server is programmed to compensate for a latency of the data points generated by the decoder of the variable autoencoder, the encoder is a first neural network that maps the sensor data into the latent space, the sensor data is in an input space, and the decoder is a second neural network that maps the compressed data into the input space.

* * * * *